United States Patent
Lee et al.

(10) Patent No.: US 7,523,242 B2
(45) Date of Patent: Apr. 21, 2009

(54) DOCKING DEVICE

(75) Inventors: Shih-Yun Lee, Chungho (TW);
Wan-Chi Lin, Taichung (TW);
Jung-Wen Chang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 261 days.

(21) Appl. No.: 11/586,573

(22) Filed: Oct. 26, 2006

(65) Prior Publication Data

US 2008/0006752 A1 Jan. 10, 2008

(30) Foreign Application Priority Data

Jul. 5, 2006 (TW) .............................. 95211830 U

(51) Int. Cl.
*H05K 7/10* (2006.01)
(52) U.S. Cl. ....................................... 710/303; 248/130
(58) Field of Classification Search ................. 710/303; 361/686, 683; 248/130–143, 917–923
See application file for complete search history.

(56) References Cited

U.S. PATENT DOCUMENTS

| 6,669,513 | B2 * | 12/2003 | Huang ......................... 439/638 |
| 6,807,050 | B1 * | 10/2004 | Whitehorn et al. .......... 361/681 |
| 6,918,562 | B2 * | 7/2005 | Lee et al. ..................... 248/130 |
| 2006/0250767 | A1 * | 11/2006 | Brophy et al. .............. 361/686 |
| 2007/0114975 | A1 * | 5/2007 | Cohen et al. ................. 320/149 |

* cited by examiner

*Primary Examiner*—Amy J. Sterling
(74) *Attorney, Agent, or Firm*—Rabin & Berdo, PC

(57) ABSTRACT

A docking device comprises a body, a stand, two fixing members and two connecting members wherein the body includes an expansion portion with multiple I/O ports and a connecting portion. With the connecting member crossing through the connecting portion of the body, the fixing member and the stand, the body can be rotated relative to the stand, which makes it convenient for a user to insert or pullout the electronic wire, cords, cable or lines into or from the docking device.

14 Claims, 5 Drawing Sheets

DOCKING DEVICE

RELATED APPLICATIONS

The present application is based on, and claims priority from, Taiwan Application Serial Number 95211830, filed Jul. 5, 2006, the disclosure of which is hereby incorporated by reference herein in its entirety.

BACKGROUND

1. Field of Invention

The present invention relates to a docking device. More particularly, the present invention relates to a rotatable docking device.

2. Description of Related Art

With the progress of technology and the demand of modern life, electronic devices like notebook computers and hand-held devices have become thinner, lighter, smaller and shorter. However, electronic devices also dispose various I/O ports (input/output port) such as USB (universal serial bus), IEEE1394, PCMCIA, monitor port (D-sub for analog signal or DVI for digital), microphone ports, internet ports and so on to increase connectivity with peripheral devices. In recent years, card readers have almost become common equipment in a notebook.

To accommodate their various I/O ports, the space in the electronic device has to be large enough to fit the I/O ports; however, this requirement goes against the design trend of modern electronic devices (light, thin, short and small). Therefore, a docking device is proposed to solve the problem. A docking device has lots of I/O ports which should be disposed in the electronic device originally, and communicate with the system or host via another specific interface. For these I/O ports, the corresponding electronic cables, wires or cords are necessary to transmit the signal between the peripheral device and the docking device. These corresponding electronic cables, wires or cords are wound up with each other and pulling out the incorrect cable can happen easily if the cables are not put in order. Besides, the I/O ports are usually disposed on the rear side (and do not face the user shelf) of the docking device making these I/O ports inconvenient to use. Pulling out the incorrect cable may lead to serious consequence such as crash of the electronic device or loss of important data.

SUMMARY

It is therefore an aspect of the present invention to provide a docking device comprising of I/O ports that are easy to use It is therefore another aspect of the present invention to provide a docking device with rotatable function to let the I/O ports face backwards.

The docking device comprises a body, a stand, two fixing members and two connecting member wherein the body includes an expansion portion with multiple I/O ports (Input/Output ports) and a connecting portion. With the connecting member crossing through the connecting portion of the body, the fixing member and the stand, the body can be rotated relative to the stand making inserting or pulling out electronic wires (includes cords, cable or lines) from the docking device convenient for the user. After that the wire has been inserted or pulled out of the docking device, the user can also rotate the docking device to let the expansion portion face backwards, which also brings the various wires to the rear side of the docking device, and thus lower the probability of incorrect action of pulling or dragging the electronic wires and increasing the aesthetics as well.

The docking device also provides positioning and fool-proof functions wherein the positioning function is achieved by a first protrusion of the connecting portion and both of a first recession and a second recession of the fixing member. The fool proof function is achieved by a sunken section of the connecting portion and a second protrusion of the fixing member. The positioning function provides a user a fit-in feeling while the fool-proof function limits the rotation.

Finally, the stand has a friction portion used to compress an elastomer during the rotation operation to generate elasticity to sustain the body of the is docking device.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1:
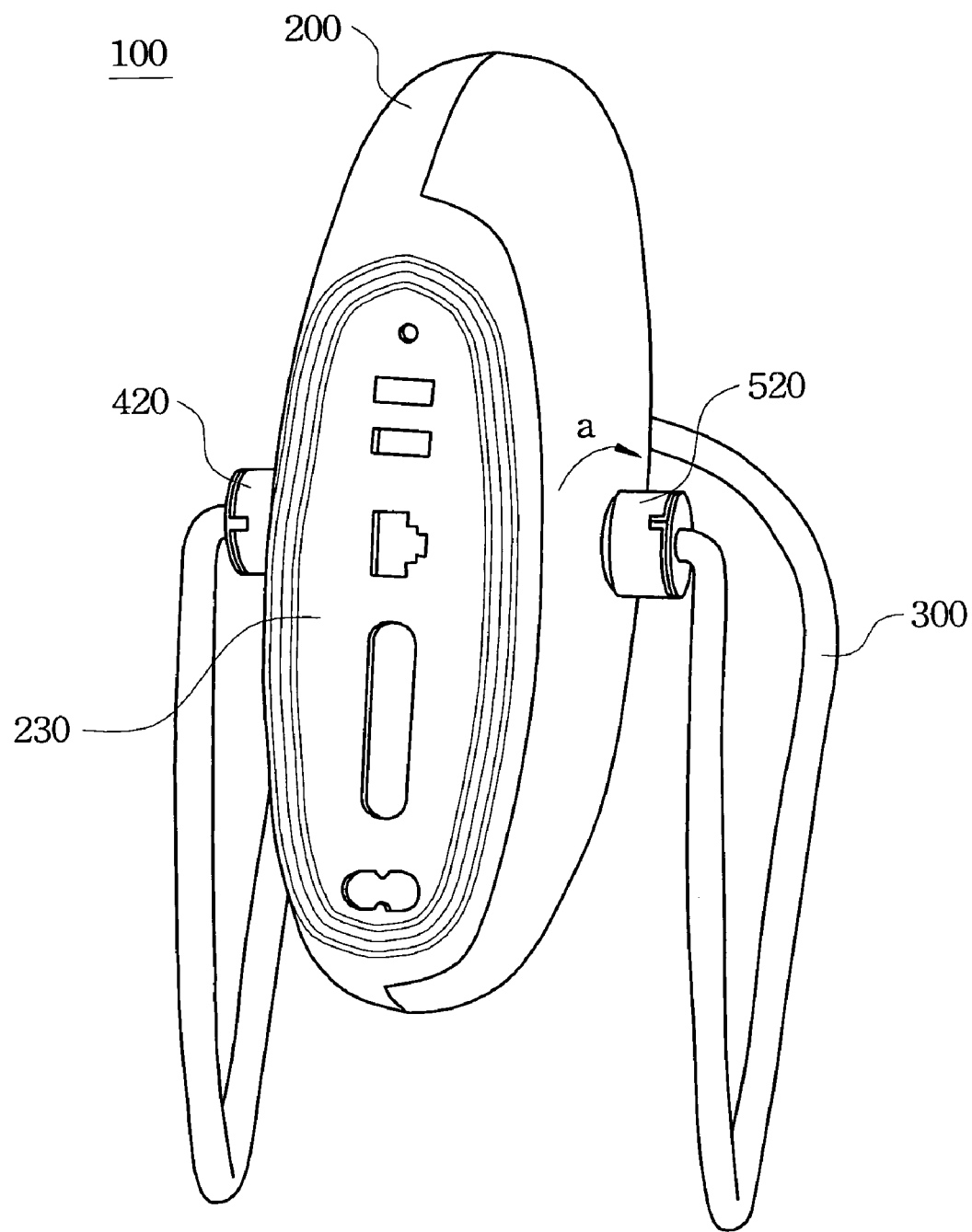
FIG. 1 is a schematic diagram of a docking device in accordance with a preferred embodiment of the present invention.

Refer to FIG. 1, FIG. 1 shows a schematic diagram of a docking device 100 in accordance with a preferred embodiment of the present invention. The docking device 100 comprises a body 200, a stand 300, a first fixing member 420 and a second fixing member 520 wherein one edge of body 200 sets an expansion portion 230 with at least one I/O port (Input/Output port) like USB, PS/2, IEEE-1394, D-sub or Internet/telephone (for ADSL) to connect a peripheral device such as a mouse, a DSC, a cellphone, a monitor or internet line. The rotation direction a means that the body 200 can rotate relative to the stand 300.

Figure 2:
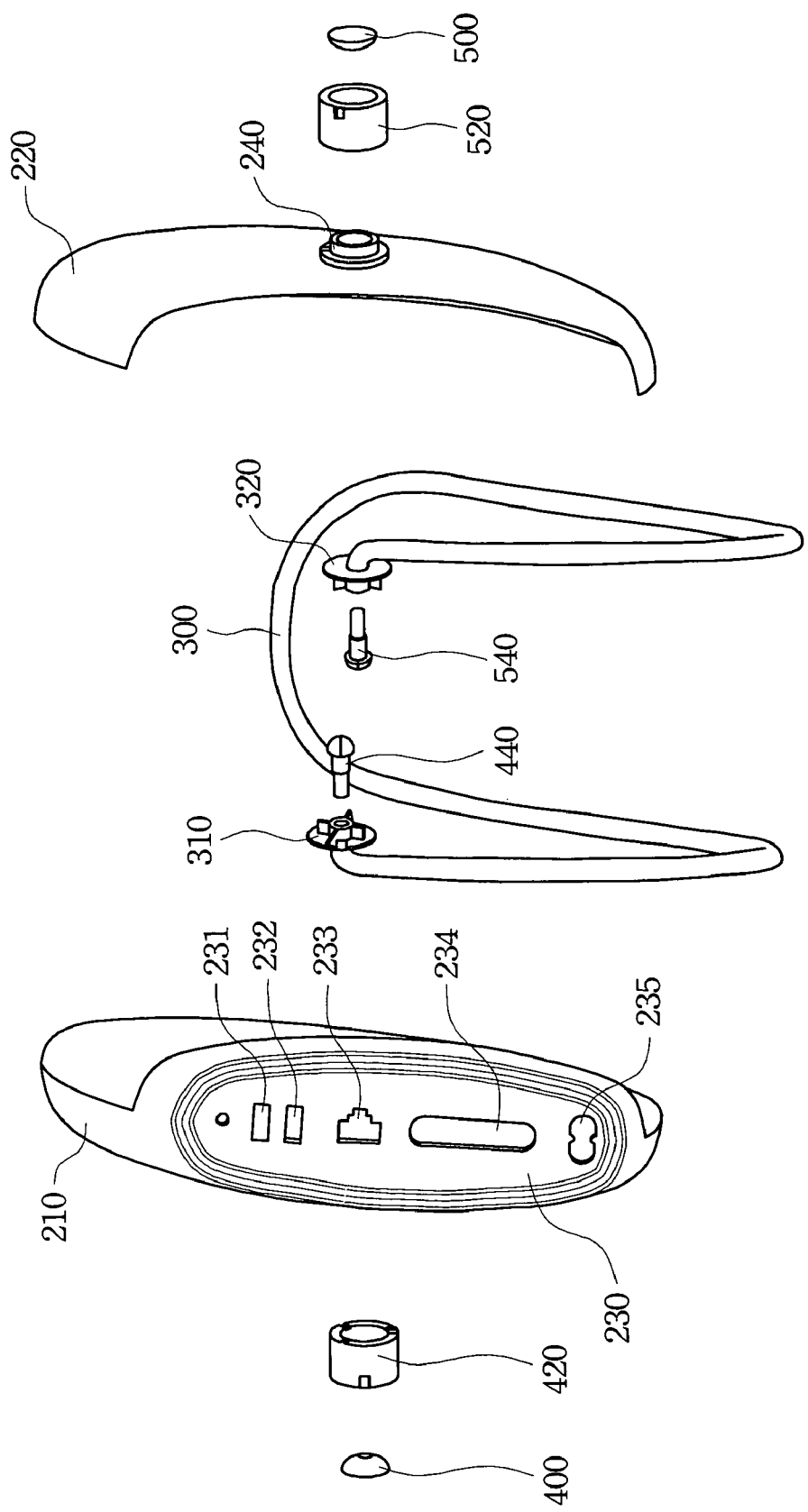
FIG. 2 is an exploded view of a docking device in accordance with a preferred embodiment of the present invention.

Refer to FIG. 2. FIG. 2 shows the exploded view of the docking device 100. As shown in FIG. 2, the docking device 100 comprises the body 200, the stand 300, the first fixing member 420, the second fixing member 520, a first connecting member 440 and a second connecting member 540 wherein the body 200 includes a first shell 210 and a second shell 220. The expansion portion 230 is set at the edge of the first shell 210 and disposes at least one I/O port such as USB port 231, USB port 232, internet/telephone port 233, monitor port 234 (D-sub for analog signal or DVI/HDMI for digital signal) and IEEE-1394 port 235 but not limited to these ports.

Both the first shell 210 and the second shell 220 have a connecting portion 240 on the outer side used to connect with the first fixing member 420, the second fixing member 520 respectively and the stand 300. The stand 300 could be made of metal, compound metal or plastic; and comprises a first end 310 and a second end 320. The first connecting member 440 crosses from inside of the body 200 through the first shell 210, the first fixing member 420, a first elastomer 400 (a spacer or a spring) and is connected with the first end 310; The second connecting member 540 crosses from inside the body 200 through the second shell 220, the second fixing member 520, a second elastomer 500 (a spacer or a spring) and is connected with the second end 320. Therefore, the body 200 can be rotated relative to the stand 300.

Figure 3:
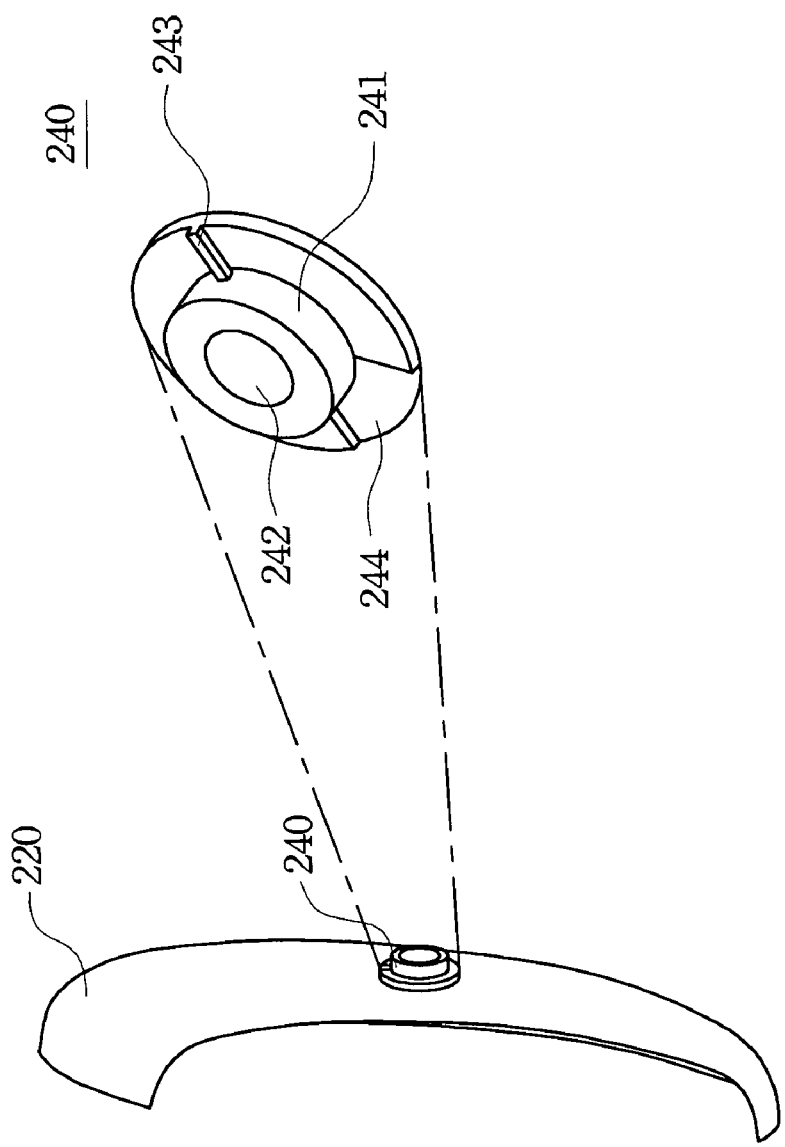
FIG. 3 is a magnified view of a connecting portion of a docking device in accordance with a preferred embodiment of the present invention.
Figure 4A:
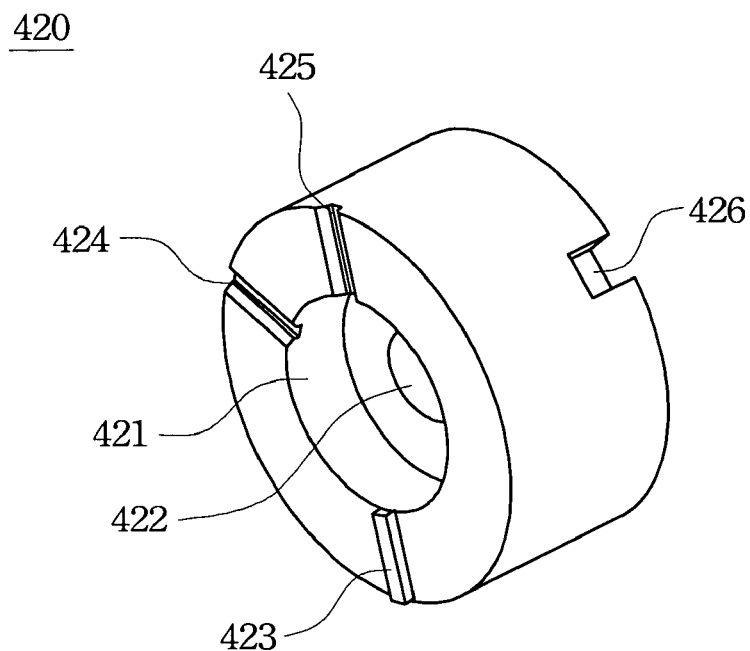
FIG. 4a is a schematic diagram of a fixing member of a docking device in accordance with a preferred embodiment of the present invention.

Refer to FIG. 3. FIG. 3 shows a magnified view of the connecting portion 240 of the body 200 of the docking device 100. From FIG. 3, the connecting portion 240 is set at the outer side of the second shell 220 (and the first shell 210) and has a convex portion 241 with a side hole 242 at the center and a first protrusion 243 set between the convex portion 241 and the rim of the connecting portion 240. Refer to FIG. 4a. FIG. 4a shows a schematic diagram of the first fixing member 420 (and the second fixing member 520) of a docking device 100. Both the first fixing member 420 and the second fixing member 520 (for example, a screw) has a first recession 424 and a second recession 425 where the angle between them is more than 30 degrees (include 30 degree), for example, 30 degrees, 45 degrees, 60 degrees, 75 degrees or 90 degrees. The first protrusion 243 would fit into the first recession 424 or the second recession 425 when a user rotates the body 200, thus, the positioning function is obtained. Besides, both the first fixing member 420 and the second fixing member 520 has a concave portion 421 with a hole 422 at the center to accommodate the convex portion 241 of the connecting portion 240.

Refer to FIG. 3 and FIG. 4a. The connecting portion 240 further comprises a sunken section 244 between the convex portion 241 and the rim of the connecting portion 240. The angle of the sunken section 244 is the same as the angle of the first recession 424 and the second recession 425. Both the first fixing member 420 and the second fixing member 520 has a second protrusion 423 corresponding to the sunken section 244, thus, the second protrusion 423 can move in the sunken section 244. Once a user pushes the second protrusion 423 to the edge of the sunken section 520 (at the same time, the first protrusion 243 would fit into the first recession 424 or the second recession 425), the sunken section 520 would stop the second protrusion 423, providing a fool-proof function or rotation limitation.

Figure 4B:
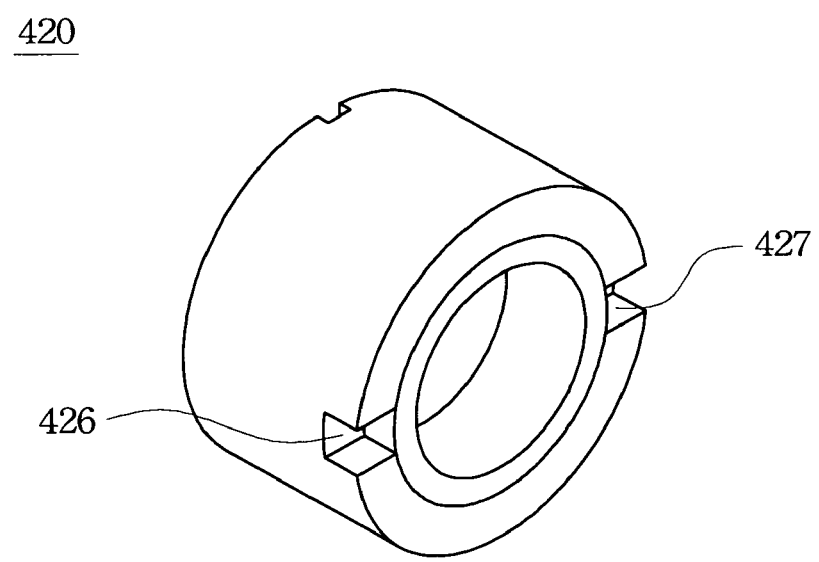
FIG. 4b is schematic diagram of a fixing member of a docking device in accordance with a preferred embodiment of the present invention.
Figure 5:
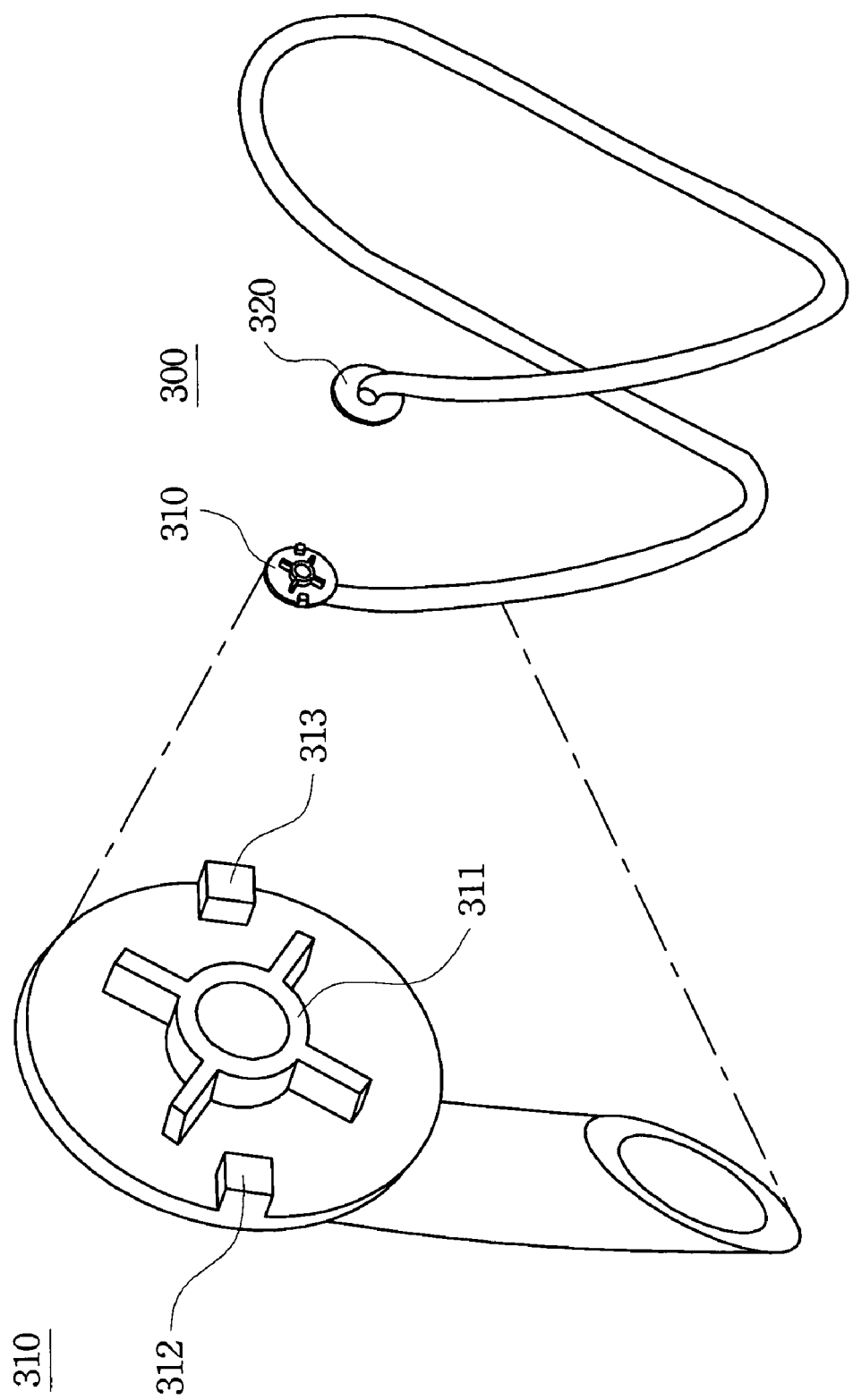
FIG. 5 is a magnified view of an end of a stand of a docking device in accordance with a preferred embodiment of the present invention.

Refer to FIG. 4b and FIG. 5. FIG. 4b shows a schematic diagram of the first fixing member 420 (and the second fixing member 520) of the docking device 100; FIG. 5 shows a magnified view of the first end 310 (and the second end 320) of the stand 300 of the docking device 100. Both the first fixing member 420 and the second fixing member 520 set a first mortise 426 and a second mortise 427 at the opposite side where the concave portion 421 being located while both of the first end 310 and the second end 320 has a first tenon 312 and a second tenon 313 corresponding to the first mortise 426 and the second mortise 427, respectively. Thus, the first fixing member 420 and the second fixing member 520 can be fastened to the first end 310 and the second end, respectively. It has to be noted that the number of the tenons and the number of the mortise is not limited to two as in this embodiment while the number of the tenons have to be identical with the number of the mortise.

In FIG. 5, both of the first end 310 and the second end 320 has a friction portion 311 which compresses the first elastomer 400 and the second elastomer 500 respectively for generating an elasticity to sustain the body 200 of the docking device 100. The structure of the friction portion 311 is designed symmetrically to generate or absorb the elasticity uniformly.

Finally, the connection between the docking device 100 and a system or host can adopt wireless technology. With the wireless technology such as is Infrared ray, blue-tooth, wireless USB, NFC (Near Field Communication), WLan (Wi-Fi), Zigbee module UWB, (Ultra Wide Band) or WiMAX (Worldwide Interoperability for Microwave Access), a user have not to place the docking device 100 by the host or server nearby which give the user a better placement efficiency.

As the forgoing disclosure, the docking device 100 provides a rotation function of the base 200 relative to the stand 300. With the rotation function, a user can rotate the expansion portion 230 to face the user self to insert/pullout an electronic wire (includes cords cable or lines) of a peripheral device into/from the I/O port easily, after that, the user can also rotate the expansion portion 230 to face backwards, at the same time, which also brings the various wires to the rear side of the docking device, thus, lowering the probability of incorrect action of pulling or dragging the electronic wires and increase aesthetic as well. Beside, the docking device 100 also provides positioning and fool-proof functions. The positioning function provides users a fit-in feeling while the fool-proof function provides the limitation the rotation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A docking device, comprising:
    a stand having a first end and a second end;
    a body including a first shell with a first connecting portion at an outer side thereof, and a second shell with a second connecting portion at an outer side thereof, wherein each of the connecting portions has a convex portion with a side hole at a center thereof and a first protrusion set between the convex portion and a rim of the connecting portion, the first shell having an expansion port with at least one I/O port;
    a first fixing member and a second fixing member, each having a concave portion with a hole at a center thereof, and a first recession and a second recession on a same side thereof;
    a first connecting member crossing from inside of the body through the first shell and the first fixing member, and being connected with the first end; and
    a second connecting member crossing from inside of the body through the second shell and the second fixing member, and being connected with the second end.

2. The docking device as claimed in claim 1, wherein each of the first end and the second end has a friction portion.

3. The docking device as claimed in claim 1, further comprising a first elastomer set between the first fixing member and the first end; and a second elastomer set between the second fixing member and the second end.

4. The docking device as claimed in claim 2, wherein the structure of the friction portion is symmetric.

5. The docking device as claimed in claim 1, wherein the first fixing member and the second fixing member each has at least one mortises set opposite to the concave portions; and both the first end and the second end of the stand has at least one tenon wherein the number of mortises equals the number of tenons.

6. The docking device as claimed in claim 1, wherein both the connecting portions of the first shell and the second shell have a sunken section between the convex portion and the rim of the connecting portion while the first fixing member and the second fixing member each have a second protrusion corresponding to the sunken section.

7. The docking device as claimed in claim 6, wherein an angle of the sunken sections is more than 30 degrees.

8. The docking device as claimed in claim 7, wherein the angle of the sunken sections is identical to an the angle between the first recession and the second recession.

9. The docking device as claimed in claim 1, wherein the stand is made of metal material, compound metal or plastic.

10. The docking device as claimed in claim 1, wherein the first fixing member and the second fixing member are screws.

11. The docking device as claimed in claim 3, wherein the first elastomer and the second elastomer is a spacer or a spring.

12. The docking device as claimed in claim 1, wherein the expansion portion includes at least one of a USB port, IEEE-1394 port, internet/telephone port, PS/2 or monitor port (D-sub and HDMI).

13. The docking device as claimed in claim 1, further comprising a wireless module to communicate with a system or a host.

14. The docking device as claimed in claim 13, wherein the wireless module is an Infrared ray module, blue-tooth module, wireless USB module, NFC module, WLan (Wi-Fi) module, Zigbee module, UWB module or WiMAX module.

* * * * *